US007235177B2

(12) United States Patent
Herman et al.

(10) Patent No.: US 7,235,177 B2
(45) Date of Patent: Jun. 26, 2007

(54) INTEGRAL AIR/OIL COALESCER FOR A CENTRIFUGE

(75) Inventors: Peter K. Herman, Cookeville, TN (US); Gregory W. Hoverson, Cookeville, TN (US); Hendrik N. Amirkhanian, Cookeville, TN (US); Jean-Luc Guichaoua, Combrit (FR); Benoit LeRoux, Fouesnant (FR); Gerard Malgorn, Quimper (FR)

(73) Assignee: Fleetguard, Inc., Nashville, TN (US)

( * ) Notice: Subject to any disclaimer, the term of this patent is extended or adjusted under 35 U.S.C. 154(b) by 213 days.

(21) Appl. No.: 10/421,472

(22) Filed: Apr. 23, 2003

(65) Prior Publication Data

US 2004/0214710 A1 Oct. 28, 2004

(51) Int. Cl.
*B01D 33/00* (2006.01)

(52) U.S. Cl. ...................... 210/360.1; 55/337; 55/401; 210/380.1; 210/512.1; 210/DIG. 5; 494/36; 494/43; 494/84

(58) Field of Classification Search ................. 494/36, 494/38, 41, 43, 83, 84; 55/337, 400, 401, 55/403, 406; 210/360.1, 380.1, 512.1, DIG. 5
See application file for complete search history.

(56) References Cited

U.S. PATENT DOCUMENTS 2,197,120 A * 4/1940 Bergmann .................. 55/408
3,075,693 A * 1/1963 Dega .......................... 494/36
3,780,937 A * 12/1973 Tahara et al. ................. 494/47
3,876,135 A * 4/1975 Harvey et al. ................ 494/37
3,931,011 A * 1/1976 Richards et al. ............ 210/136
4,557,831 A 12/1985 Lindsay et al. ............. 210/232
5,217,606 A 6/1993 Ramponi et al. ........... 210/136
5,562,087 A 10/1996 Wright ....................... 123/372
5,564,401 A 10/1996 Dickson ..................... 123/573
5,669,366 A 9/1997 Beach et al. ................ 123/572
5,674,392 A * 10/1997 Christophe et al. ......... 210/298
6,017,300 A 1/2000 Herman ....................... 494/49
6,019,717 A 2/2000 Herman ....................... 494/49
6,058,917 A 5/2000 Knowles ..................... 123/573
6,095,964 A 8/2000 Purvey
6,139,595 A 10/2000 Herman et al. ............... 55/312
6,152,120 A 11/2000 Julazadeh ................... 123/572
6,161,529 A 12/2000 Burgess ...................... 123/572
6,213,929 B1 * 4/2001 May ............................ 494/24
6,261,455 B1 7/2001 Brown et al. ............ 210/380.1

(Continued)

FOREIGN PATENT DOCUMENTS

DE 196 47 803 5/1998

(Continued)

*Primary Examiner*—Joseph Drodge
(74) *Attorney, Agent, or Firm*—Andrus, Sceales, Starke & Sawall, LLP; J. Bruce Schelkopf

(57) ABSTRACT

A centrifuge for separating particulate matter from circulating fluid includes a centrifuge enclosure including a housing and a base joined together so as to define a hollow interior. A rotor is positioned in the hollow interior and is supported by the base in a manner to permit rotary motion of the rotor relative to the centrifuge enclosure. A coalescing filter assembly is secured to the rotor and is constructed and arranged for removing oil aerosol from a blowby gas which is introduced into the centrifuge. A roller bearing, press fit into the centrifuge housing, receives a portion of the coalescing filter assembly.

24 Claims, 12 Drawing Sheets

U.S. PATENT DOCUMENTS

| | | | | |
|---|---|---|---|---|
| 6,296,765 | B1 | 10/2001 | Brown et al. | 210/380.1 |
| 6,312,372 | B1 | 11/2001 | Larsson et al. | 494/49 |
| 6,364,822 | B1 | 4/2002 | Herman et al. | 494/49 |
| 6,530,969 | B2 | 3/2003 | Gieseke et al. | 55/330 |
| 6,540,653 | B2 | 4/2003 | Herman et al. | 494/74 |
| 6,551,230 | B2 | 4/2003 | Herman et al. | 494/75 |
| 6,579,220 | B2 | 6/2003 | Herman et al. | 494/49 |
| 6,652,439 | B2 | 11/2003 | Herman et al. | 494/75 |
| 2001/0012814 | A1 | 8/2001 | May et al. | 494/24 |

FOREIGN PATENT DOCUMENTS

| | | |
|---|---|---|
| DE | 198 03 872 | 8/1999 |
| DE | 199 14 166 | 10/2000 |
| EP | 1 260 260 | 11/2002 |
| WO | WO-99/56883 | 11/1999 |
| WO | WO-03/037521 | 5/2003 |

* cited by examiner

INTEGRAL AIR/OIL COALESCER FOR A CENTRIFUGE

BACKGROUND OF THE INVENTION

The present invention relates in general to diesel engine filtration systems and in particular to a coalescing filter to remove oil aerosol from a blowby gas (exhaust) stream. More specifically, the present invention relates to a coalescing filter which is subjected to rotation in order to expel the coalesced liquid from the filter and thereby keep any flow restriction within the filter comparatively low.

The present invention focuses on the addition of an air/oil coalescing filter as part of a rotating lube bypass centrifuge in order to remove oil aerosol from blowby gas associated with an internal combustion engine crankcase ventilation system. The coalescing filter is subjected to high-speed rotation which assists in expelling the coalesced liquid (oil) from the filter. This in turn helps to maintain a low filter restriction and a low crankcase pressure.

In order to achieve high separation efficiency for oil aerosol in the 0.1–1.0 micron size range, it is necessary to use a relatively "tight" coalescing medium which is constructed from very fine fibers (melt-blown or glass). A consequence of fine fibers is the corresponding fine pore size distribution. The presence of fine pores in a coalescing filter can result in the pores becoming "clogged" with the liquid being separated, due to the surface tension and the corresponding "bridging" effect. This relatively high surface tension causes a correspondingly high restriction since it takes a large pressure to overcome the surface tension across a small wetted pore. It is known that the pressure required to "blow out" a pore is inversely proportional to the pore diameter. This behavior has been clearly verified by testing with various grades of media. What has been learned is that the pressure required to break through the film of a wetted pore is several times higher than the "dry" restriction at design face velocity. The lowest reported difference in wet flow restriction compared to dry flow restriction was a 3-fold increase in flow restriction for the wetted condition.

Since engine crankcase pressure must be kept very near atmospheric pressure, approximately 5 inches of water, it is difficult to design a high-efficiency coalescer without resorting to a fairly elaborate arrangement of pressure control valves, vacuum assist devices, and similar mechanisms. For this reason, a means of keeping the coalescer element dry and operating at a low restriction is important for any useful improvement.

This technology has heretofore been utilized in integrating a coalescing filter with a rotating component, specifically a gear within a gear housing, as described in U.S. Pat. No. 6,139,595 which issued Oct. 31, 2000 to Herman, et al. U.S. Pat. No. 6,139,595 is hereby expressly incorporated by reference for its entire disclosure. However, prior designs such as that disclosed in the '595 patent, where the coalescing filter is mounted to a structure such as a gear, have had their performance limited to some degree due to the rather low speed of the rotating component, such as one half of the engine speed. The present invention overcomes that limitation by mounting the coalescing filter to a component with a much higher rotative speed, specifically a lube system centrifuge rotor.

Higher rotative speeds increase the "cleaning effect" that is seen in the coalescing filter element, as described in the '595 patent. The "cleaning effect" occurs as a result of the centrifugal force pulling the collected oil out of the pores of the media radially outward of the filter element. By generating large enough centrifugal forces, one can theoretically extend filter life indefinitely. The present invention integrates a coalescing filter assembly with the rotating component of a bypass lube centrifuge, such that the blowby flow must pass through the spinning coalescing filter element prior to exhausting to the atmosphere or being fed back into the air intake system upstream of the air filter. The centrifugal force imparted to the oil collected within the coalescing filter element causes the separated oil to be rapidly expelled, as has been described in the '595 patent. The integration of the coalescing filter assembly with a centrifuge, according to the present invention, is seen as a novel and unobvious improvement to the current state of the art.

SUMMARY OF THE INVENTION

A centrifuge for separating particulate matter from a circulating fluid according to one embodiment of the present invention comprises a centrifuge enclosure including a housing and a base joined together and defining a hollow interior, a rotor positioned in the hollow interior and supported by the base, a coalescing filter assembly secured to the rotor, the coalescing filter assembly being constructed and arranged for removing oil aerosol from a blowby gas, and bearing means positioned between the coalescing filter element and the centrifuge enclosure.

One object of the present invention is to provide an improved centrifuge which includes an integral coalescing filter assembly.

Related objects and advantages of the present invention will be apparent from the following description.

DESCRIPTION OF THE PREFERRED EMBODIMENTS

Figure 1:
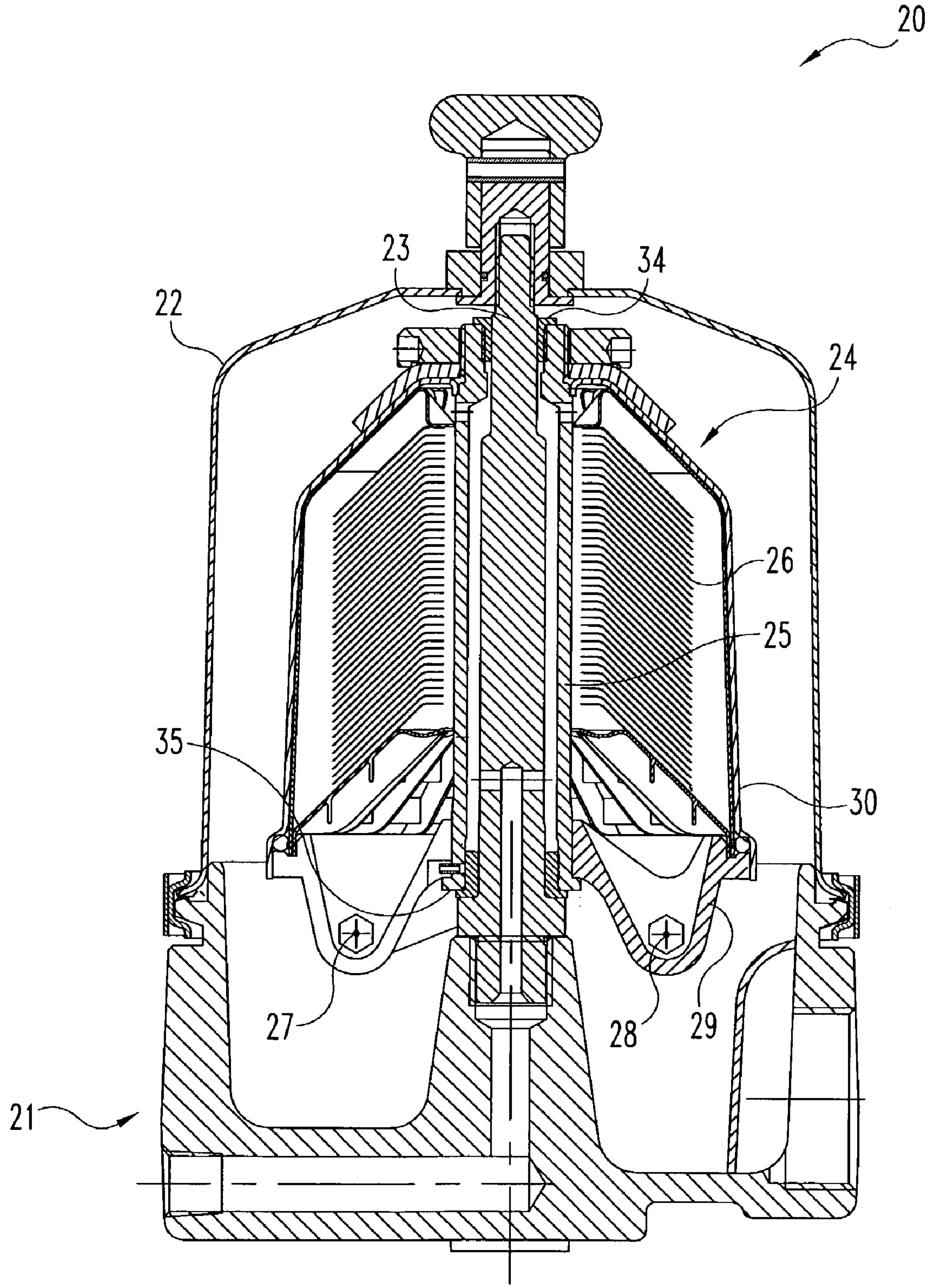
Fig. 1 (PRIOR ART)
FIG. 1 is a front elevational view, in full section, of a prior art cone-stack centrifuge.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a prior art centrifuge 20 with a take-apart rotor assembly. This illustration is provided in order to help explain the starting centrifuge structure prior to integration of a coalescing filter, according to the present invention. Centrifuge 20 includes, as some of its primary components, base 21, bell housing 22, shaft 23, and rotor assembly 24, including rotor hub 25, cone-stack 26, tangential flow jet nozzles 27 and 28, bottom plate 29, and centrifuge bowl 30 securely sealed to bottom plate 29. Axially extending through the center of bottom plate 29 and through the interior of centrifuge bowl 30 is a hollow rotor hub 25. Rotor hub 25 is bearingly mounted to and supported by shaft 23 by means of upper and lower bearings 34 and 35, respectively.

At the lower region of bottom plate 29 are two tangential flow nozzles 27 and 28. These tangential flow nozzles are symmetrically positioned on opposite sides of the axis of rotor hub 25, and their corresponding flow jet directions are opposite to one another. As a result, these flow nozzles are able to create the driving force (Hero turbine) for rotating rotor assembly 24 about shaft 23 within bell housing 22, as is believed to be well known in the art. Spinning of rotor assembly 24 can also be accomplished with a single flow nozzle or with the use of more than two flow nozzles. Additionally, as will be described herein, the Hero turbine of the FIG. 1 prior art structure can be replaced with an impulse turbine for spinning of the rotor assembly.

The FIG. 1 structure generally coincides with the centrifuge that is disclosed in U.S. Pat. No. 6,364,822. The '822 patent issued Apr. 2, 2002 to Herman, et al., and is hereby expressly incorporated by reference.

What is important to understand from the FIG. 1 illustration and the description of centrifuge 20 is the level of rotational speeds which can be achieved from this structure, including the use of flow jet nozzles 27 and 28. While the high RPM spinning rate of the cone-stack assembly as part of the rotor 24 enables small particles of soot to be separated out of the circulating oil, this high RPM spinning rate can also be used for spinning a coalescing filter element. It is this expanded capability that is the focus of the present invention.

Figure 2:
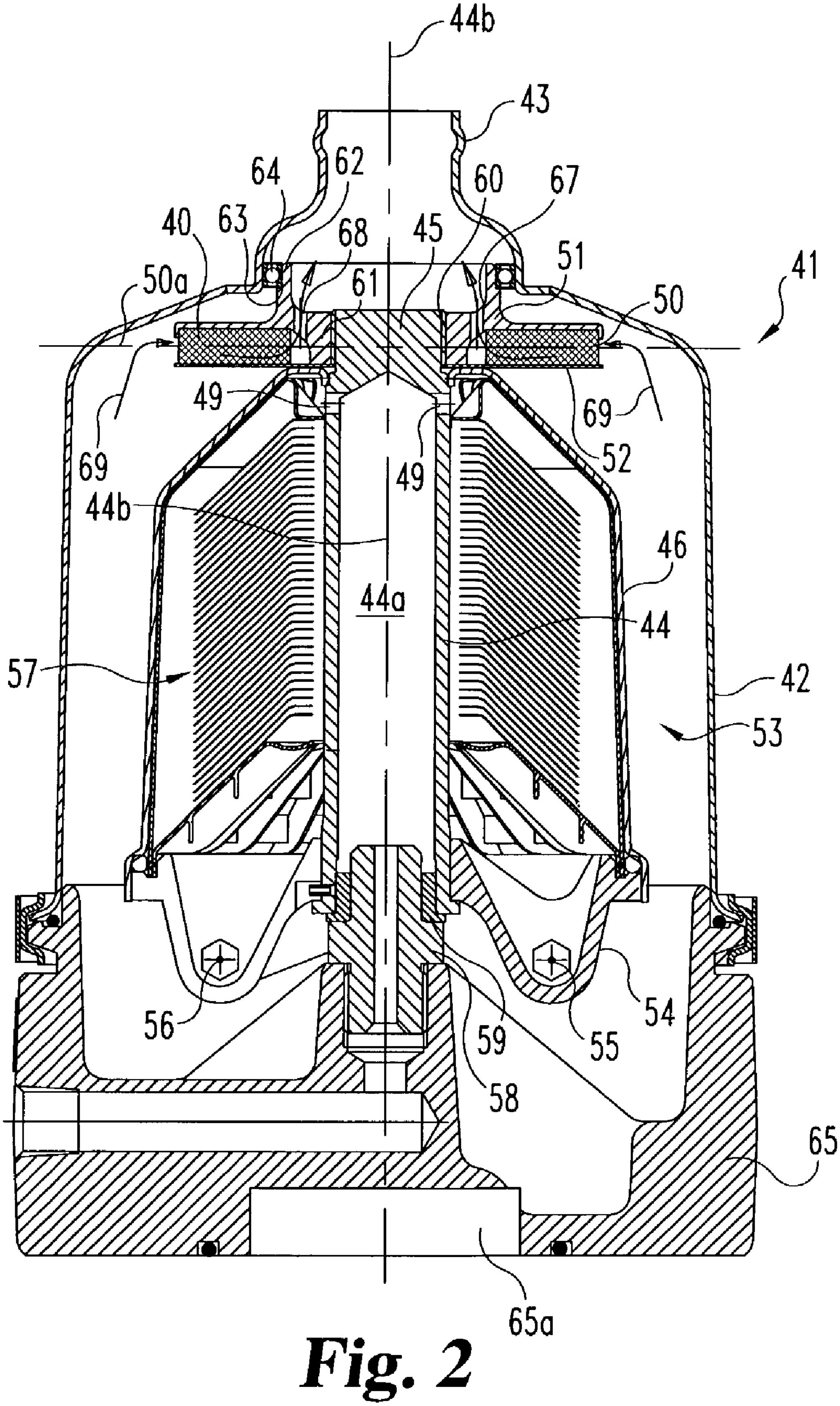
FIG. 2 is a front elevational view, in full section, of a cone-stack centrifuge according to one embodiment of the present invention.

Referring now to FIG. 2, the present invention integrates a coalescing filter assembly 40 with the rotating component, (i.e., rotor) of a bypass lube centrifuge 41. While a majority of centrifuge 41 is identical to centrifuge 20, there are a few differences, principally in the uppermost region where the prior bell housing 22 is replaced by a newly configured bell housing 42 which includes an open blowby outlet 43. This design change in turn causes a change in the manner in which the bell housing is secured to the shaft and the design of the shaft. The new centertube 44 has a hollow interior **44*a* and a closed upper end 45. Centertube 44 extends through the top of rotor housing 46 and includes flow openings 49 for the delivery of oil into the rotor assembly. Centertube 44 has an axial centerline 44*b* which is substantially vertical and defines the axis of rotation for the rotor assembly. An inlet through base drain hole 65*a* is provided in the centrifuge 41** for the introduction of blowby gas.

The coalescing filter assembly 40 includes a filter element 50, a filter carrier 51, and a lower support plate 52. The filter carrier 51 is bonded to the upper surface of element 50 and plate 52 is bonded to the lower surface of element 50. The rotor assembly 53 of centrifuge 41 includes, in addition to centertube 44 and rotor housing 46, a base 54 with tangential flow nozzles 55 and 56 and particulate separating mechanism 57 which, in the preferred embodiment, is a cone-stack subassembly 57. The rotor assembly 53 is designed as a "take-apart" centrifuge rotor and the design of the coalescing filter assembly 40 facilitates this "take-apart" concept. As will be understood from the FIG. 2 illustration, housing 42 is clamped to base 65 so as to define a hollow interior. The rotor assembly 53 is positioned within the hollow interior and is supported by base 65 by means of the support shaft 58 and bearing 59.

The coalescing filter assembly 40 is constructed and arranged to perform its primary air/oil separation function. Additionally, coalescing filter assembly 40 is constructed and arranged to serve several distinct functions in cooperation with the "take-apart" centrifuge rotor construction. One such function focuses on filter carrier 51 and its use as a "top nut" that holds or clamps the rotor housing 46 in position. Filter carrier 51 includes a threaded inside diameter 60 which threadedly engages the threaded outer surface of end 45 of centertube 44. The lower support plate 52 extends beneath wall 61 of filter carrier 51 and it is lower support plate 52 that clamps against the upper surface of rotor housing 46. In order to service centrifuge 41, utilizing this coalescing filter assembly 40 structure, the coalescing filter assembly 40 is unscrewed from centertube 44 which functions as the rotor hub. Once the coalescing filter assembly 40 is unscrewed from the rotor hub, the rotor housing 46 is able to be separated from the remainder of the rotor assembly 53.

The upper annular wall 62 of filter carrier 51 includes a generally cylindrical outside diameter 63 that mates with the inside diameter of sealed bearing 64. Bearing 64 is press fit into bell housing 42 and remains with the bell housing 42 when it is separated from centrifuge base 65. Bearing 64 provides minimal rotational drag, thereby permitting high speed operation of rotor assembly 53. The sealed construction of bearing 64 (i.e., the bearing seals) prevents blowby gas from bypassing element 50 of the coalescing filter assembly 40. This in turn ensures a high air/oil separation efficiency. The annular connecting portion 67 of filter carrier 51 that is positioned between wall 61 and wall 62 defines and equally spaced series of axially extending passages 68. Passages 68 provide part of the exit path for the blowby gas after it flows through filter element 50 before exiting from blowby outlet 43. It should be understood that the filter element 50 has a generally radial centerline which effectively defines the flow path through the filter element. This radial centerline is substantially perpendicular to the rotational axis or centertube centerline **44*b*. In the FIG. 3** embodiment, the flow centerline that extends through the filter element is inclined at an acute angle relative to the axis of rotation for the rotor.

The size, shape, and inward extension of lower support plate 52 to a position below wall 61 helps to create an enclosed chamber around filter element 50. This construction ensures that the blowby gas entering element 50 (see arrow 69) will exit by way of passages 68 after passing through element 50. This lower support plate 52 is a thin, flat plastic endcap-like member that is bonded or potted with a conventional adhesive to the filter element 50. This attachment method is referred to as "mirror bonded". The inner portion of this support plate 52 is flexible, thereby allowing it to bend as it is clamped or sandwiched between filter carrier 51 (wall 61) and rotor housing 46 when the filter carrier 51 is threadedly tightened onto the rotor hub (i.e., centertube 44). This construction provides an air tight seal between the support plate 52 and the rotor housing 46 and between plate 52 and carrier 51, preventing any bypass of the blowby gas around element 50.

Figure 3:
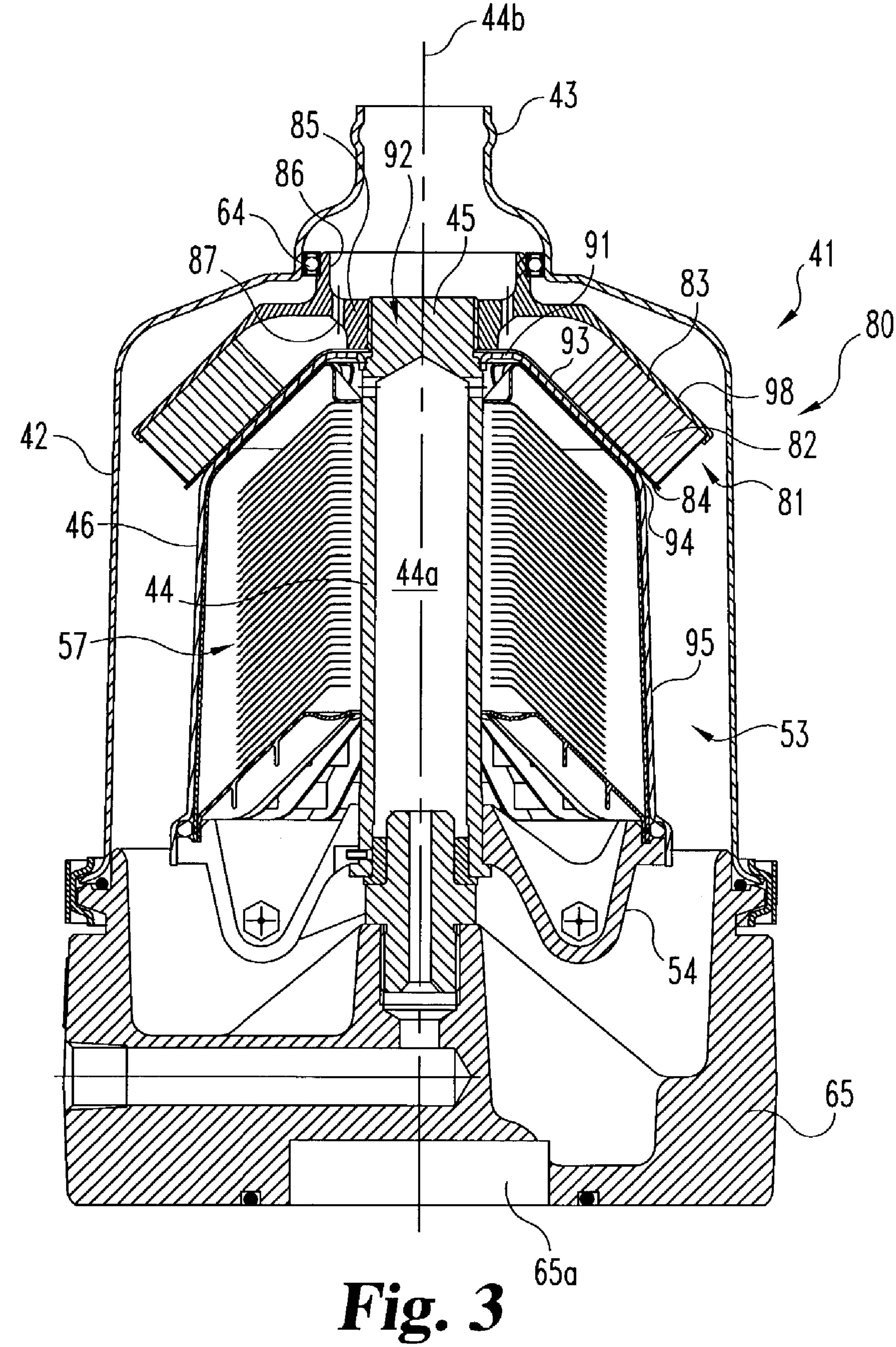
FIG. 3 is a front elevational view, in full section, of a cone-stack centrifuge according to another embodiment of the present invention.

Referring now to FIG. 3, centrifuge 80 is identical to centrifuge 41 with the exception of the coalescing filter assembly. The coalescing filter assembly 40 of FIG. 2 is replaced with coalescing filter assembly 81 in centrifuge 80. With the exception of coalescing filter assembly 81, the reference numbers used for centrifuge 41 apply to centrifuge 80. As for coalescing filter assembly 81, it includes a filter element 82, a filter carrier 83, and a lower support plate 84. Similar in many respect to filter carrier 51, filter carrier 83 includes an inner annular wall 85, an upper annular wall 86, and an annular connecting portion which includes a series of equally-spaced, axially-extending passages 87. Annular wall 85 is internally threaded for threaded engagement onto the threaded end 45 of centertube 44. The principal differences between coalescing filter assembly 40 and coalescing filter assembly 81 are embodied in the shape of the filter carrier 83, the shape of the lower support plate 84, and the orientation of filter element 82. In the centrifuge 41 structure of FIG. 2, the filter element 50 is substantially horizontal relative to vertical (axial) centerline 44*b*. If centerline 44*b* is not actually oriented in a true vertical direction, depending on the specific mounting of centrifuge 41, it should be understood that the radial (flow) centerline 50*a* of filter element 50 remains substantially perpendicular to centerline 44*b*.

In centrifuge 80, the coalescing filter assembly 81 is shaped in order to conform to the shape of the rotor housing 46. Specifically, the rotor housing includes a relatively short horizontal top surface 91 which defines circular opening 92 through which the centertube 44 extends. Surface 91 extends radially symmetrically about centerline 44*b* into frustoconical surface portion 93. The incline angle of surface portion 93 is approximately 45 degrees. This inclined (frustoconical) surface extends into bend 94 before changing into annular sidewall 95 of rotor housing 46. As is illustrated, support plate 84 is shaped so as to conform to the size and shape of surface 91 and surface portion 93, down to bend 94. The actual size of plate 84 allows it to extend beyond bend 94. The inside diameter of plate 84 is sized to provide clearance for closed upper end 45.

The filter carrier 83 includes a radially outer portion 98 which is substantially perpendicular to that portion of support plate 84 which extends across frustoconical surface portion 93. The filter element 82 is positioned between these two substantially parallel portions. All other structural and functional aspects of coalescing filter assembly 81 are the same as those of coalescing filter element 40, as has been described. All sealed interfaces are retained and the path for the blowby gas remains the same, except for the inclined path through filter element 82. There is no bypass path that would allow the blowby gas to avoid filter element 82. The blowby gas flowing through filter element 82, from the outside toward the inside, is directed through passages 87 and from there out through blowby outlet 43.

The centrifuge designs of FIGS. 2 and 3 are best described as "take-apart" constructions due to the ability to remove the rotor from the centrifuge and, importantly, the ability to disassemble the rotor. This enables the component parts of the rotor to be cleaned and reused. This in turn permits a wider choice of materials that can be used for the component parts of the rotor assembly. An alternative to this construction is to configure the rotor as a disposable unit. Disposable rotor constructions and selected component parts and subassemblies are illustrated in FIGS. 4–12. While the two disposable rotor designs and the cooperating centrifuges are similar in most respects, there are differences in the selected structures. In the first disposable rotor/centrifuge design of FIGS. 4 and 5, an elastomeric lip seal is used to prevent gas bypass of the coalescing filter element. In the second disposable rotor/centrifuge design of FIGS. 6 and 7, a (non-contact) sealed roller bearing is used to prevent gas bypass of the coalescing filter element. This second design also provides minimum drag for maximum speed and could be considered to be the preferred design of the two disposable rotor designs that are illustrated and described for this reason.

Figure 4:
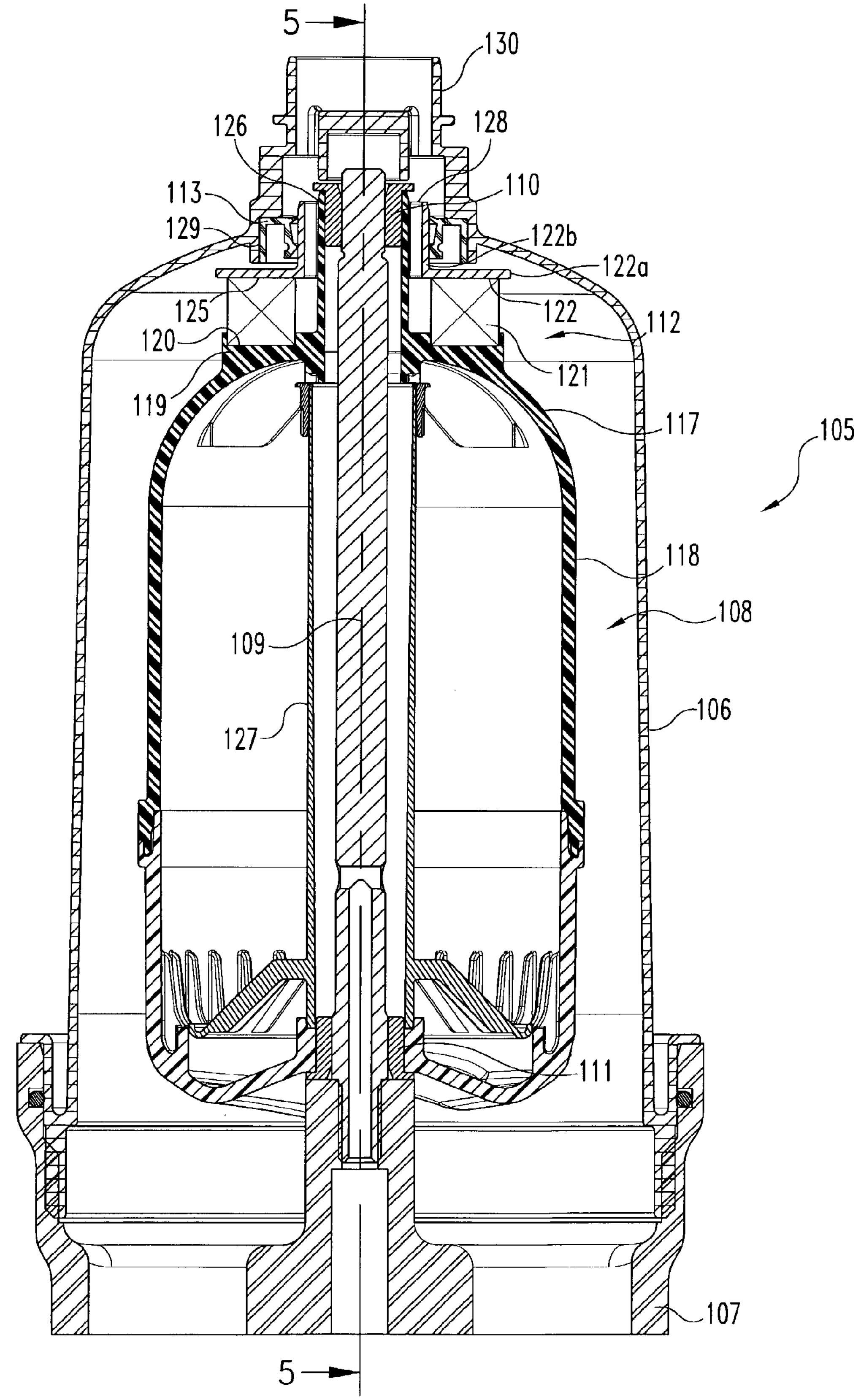
FIG. 4 is a front elevational view, in full section, of a centrifuge including a disposable rotor according to another embodiment of the present invention.
Figure 5:
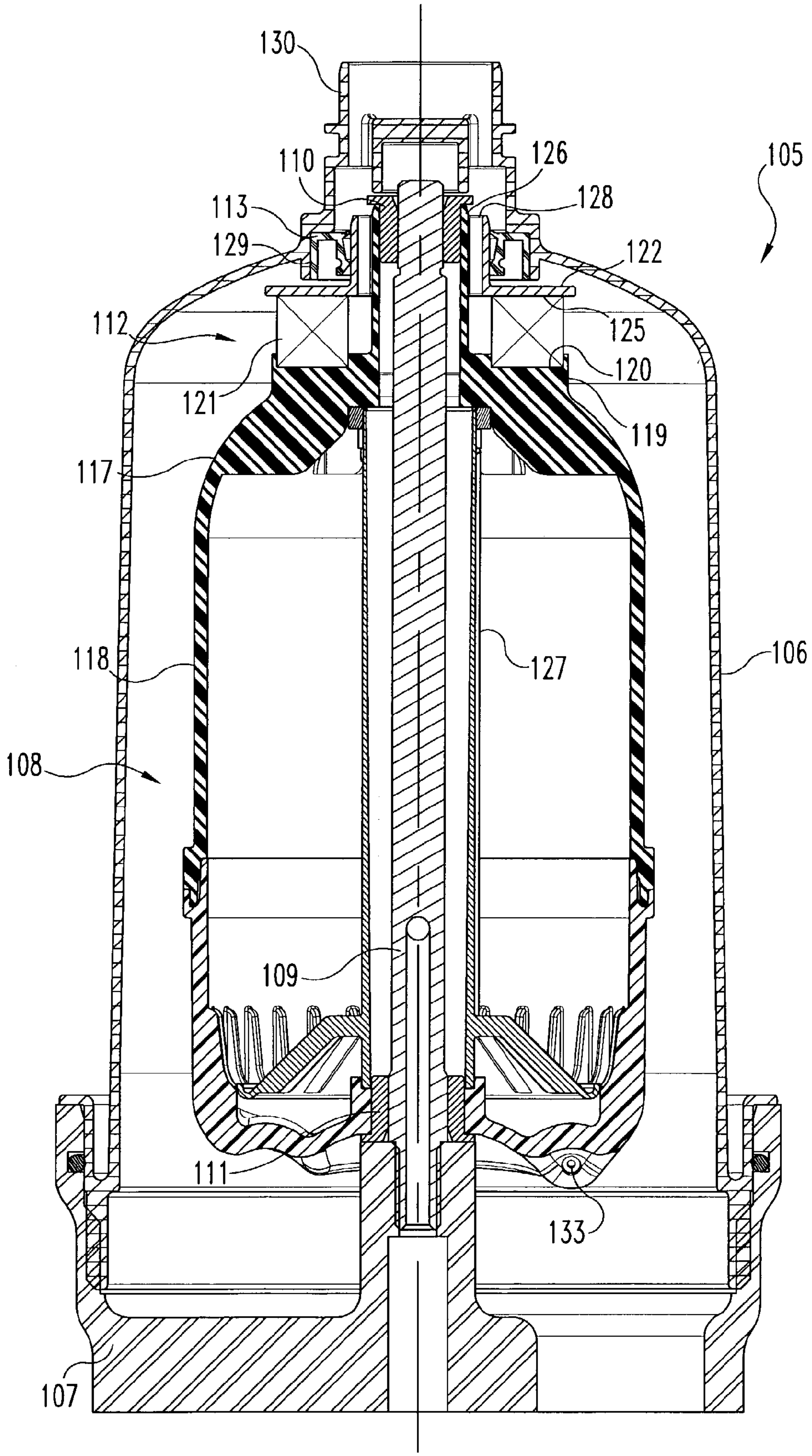
FIG. 5 is a front elevational view, in full section, of the FIG. 4 centrifuge.
Figure 8:
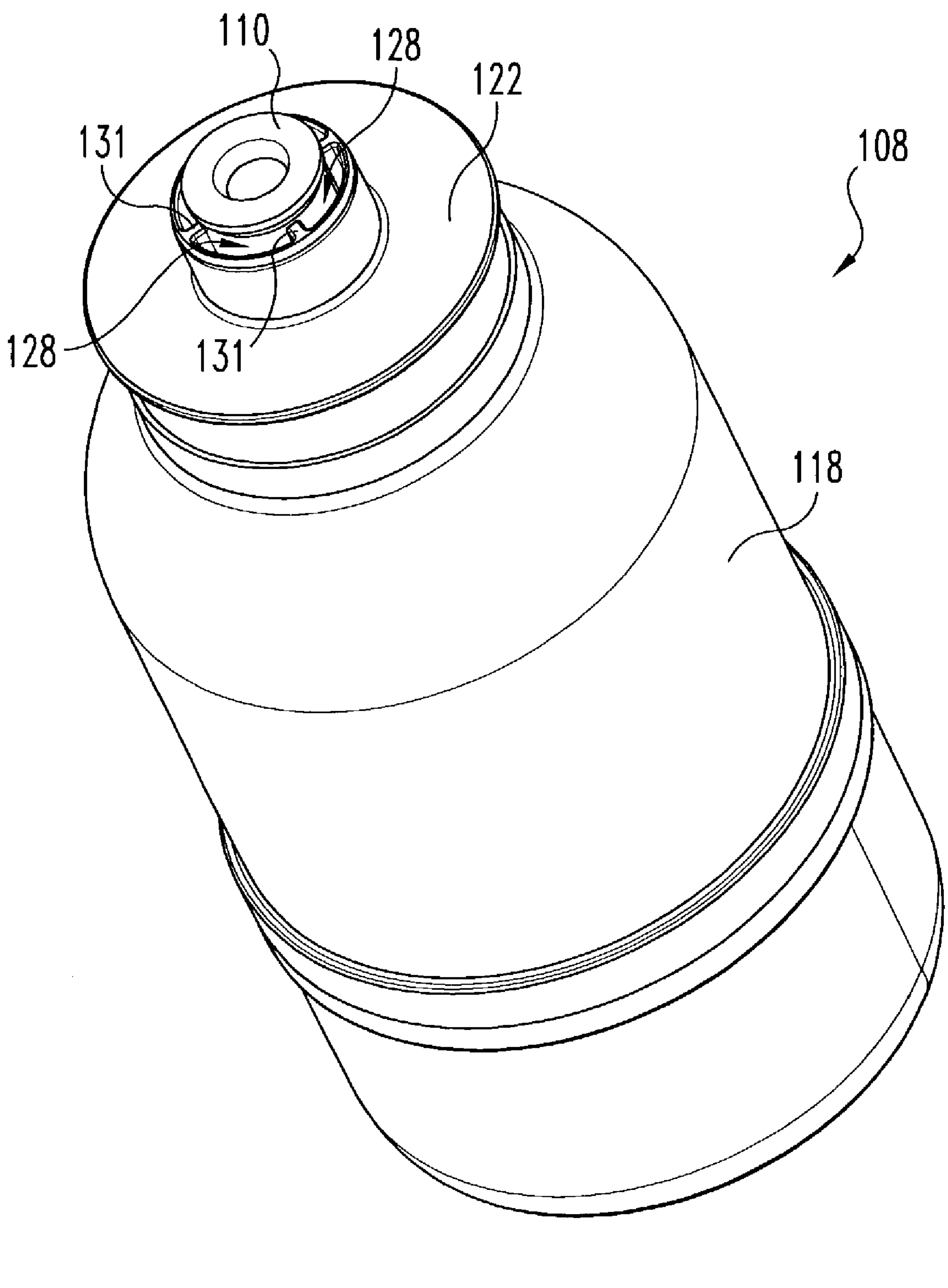
FIG. 8 is a perspective view of a rotor assembly according to one embodiment of the present invention.
Figure 10:
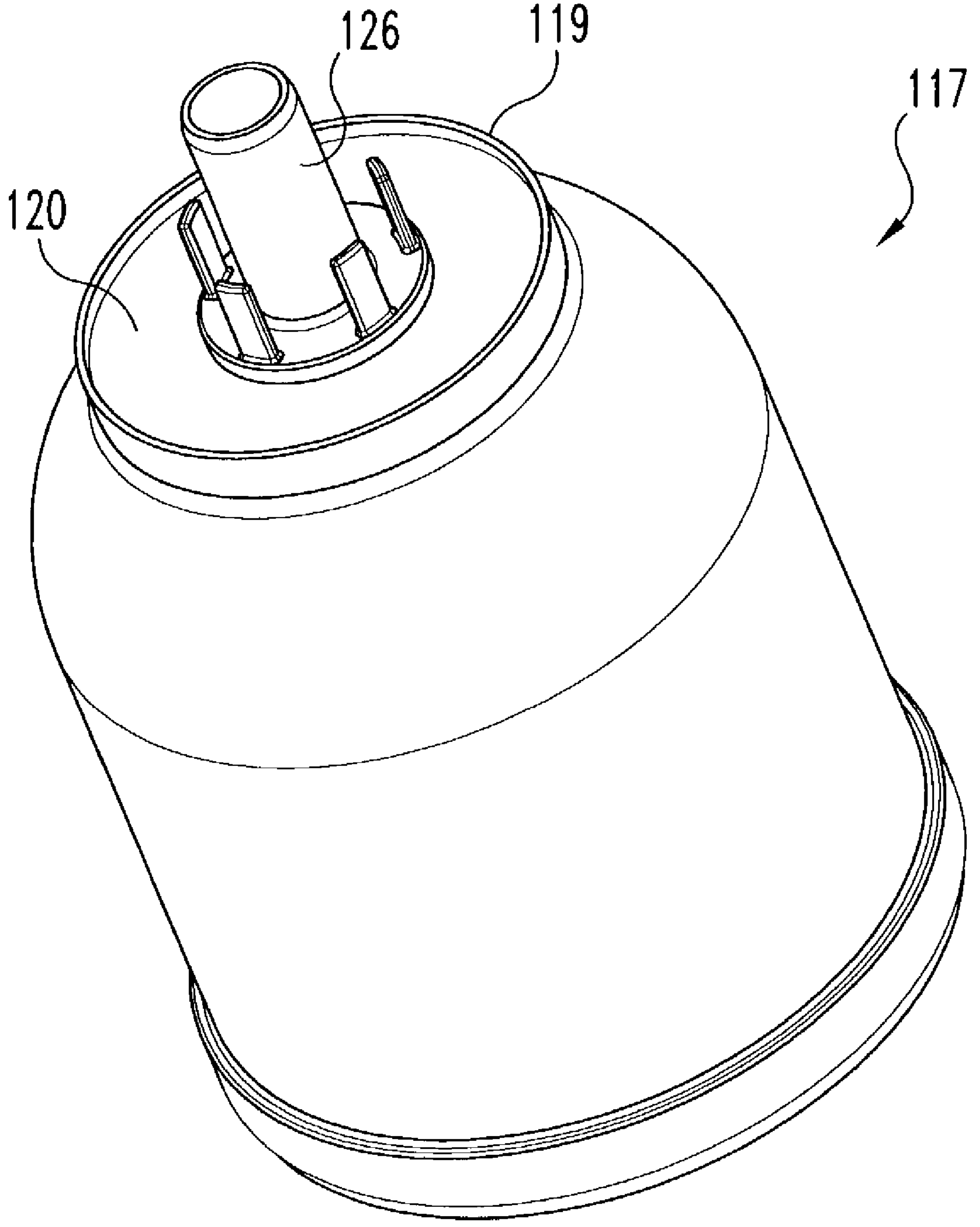
FIG. 10 is a perspective view of a rotor upper shell portion that is suitable for use as part of either the FIG. 8 rotor assembly or the FIG. 9 rotor assembly.
Figure 11:
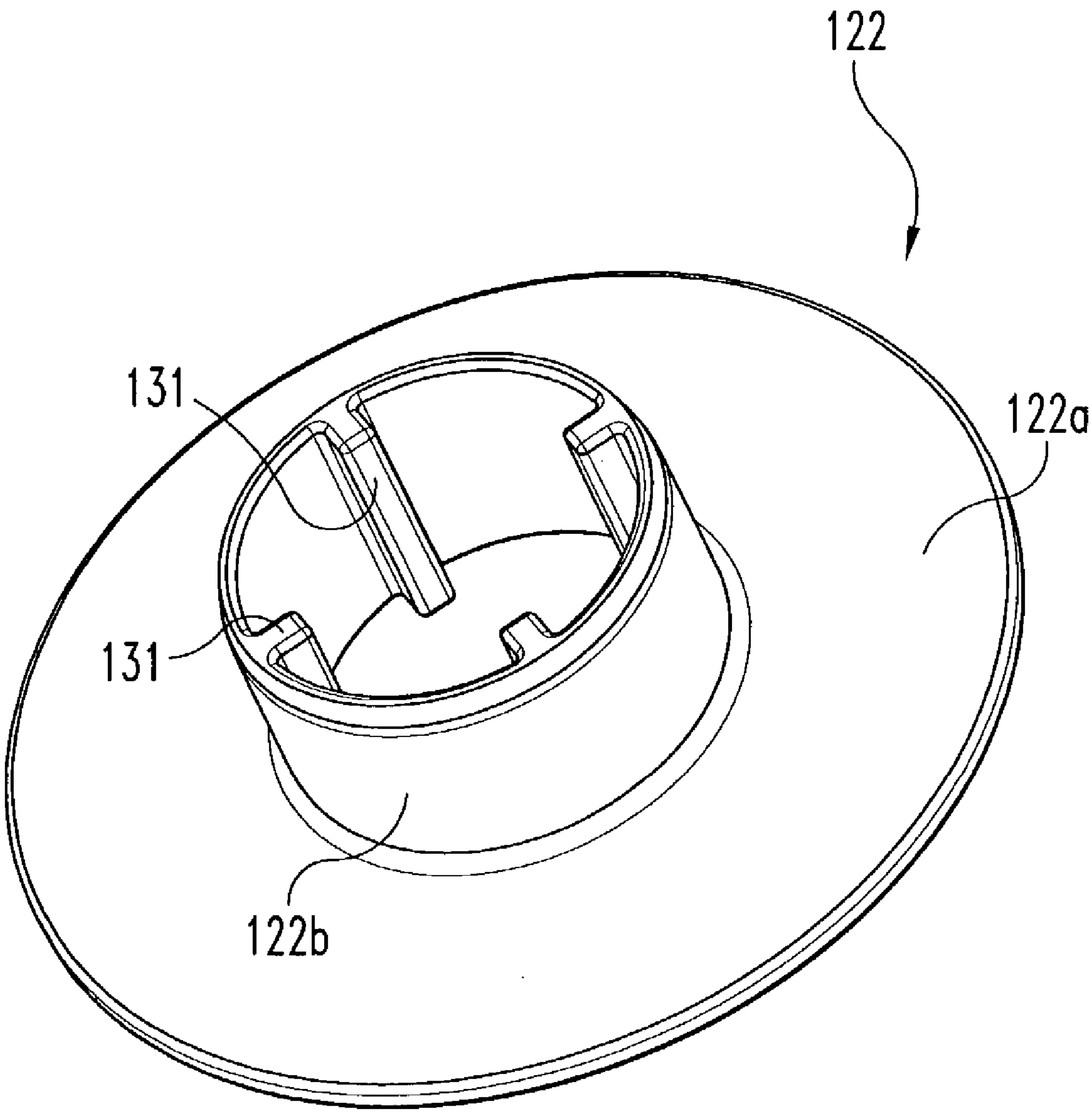
FIG. 11 is a perspective view of a top end plate that comprises one part of the FIG. 8 rotor assembly.

Referring first to FIGS. 4 and 5, it should be noted that the full section view of FIG. 5 is turned ninety degrees from the full section view of FIG. 4. While the same overall structure is illustrated, having two views which are ninety degrees apart helps to provide a more complete understanding of the disposable rotor construction. Additionally, FIG. 8 illustrates the rotor assembly for this first disposable rotor design. FIG. 10 illustrates the upper portion of the rotor shell or housing. FIG. 11 illustrates the top end plate 122 that functions as a filter carrier and constitutes part of the FIG. 8 rotor assembly for this first disposable rotor design.

Centrifuge 105 includes a centrifuge housing 106, cooperating base 107, disposable rotor 108, shaft 109, bushings 110 and 111, coalescing filter assembly 112, and annular elastomeric lip seal 113. With the exception of the coalescing filter assembly 112 and the elastomeric lip seal 113, centrifuge 105 is of a generally conventional construction, including the design, construction, and arrangement of the disposable rotor 108 within the centrifuge housing 106. The focus of the present invention is directed to the integration of a coalescing filter assembly, for processing blowby gas, into a centrifuge that includes a disposable rotor. In order to do so, the upper section 117 of the rotor housing 118 is molded with an annular support shelf 119 having an annular ring-shaped recess 120. The filter element 121 fits down into recess 120 and is captured therein by means of an adhesive or bonding (potting) compound. The remainder of the coalescing filter assembly 112 includes filter carrier 122 which captures the upper surface 125 of the filter element 121.

The reshaping and contouring of upper section 117 for the integration of the coalescing filter assembly 112 further includes the addition of an upwardly-extending cylindrical wall 126. Wall 126 as well as shelf 119 are part of the unitary (molded plastic) construction of upper section 117. Wall 126 is generally concentric relative to centertube 127, shaft 109, rotor housing 118, and the axis of rotation for the disposable rotor 108. The upper, open end of wall 126 receives bushing 110 and bushing 110 in turn receives the end of shaft 109. This construction enables a high rate of rotation for the disposable rotor 108.

Filter carrier 122 includes a horizontal base portion 122*a* and a cylindrical tube portion 122*b*. Tube portion 122*b* is sized and positioned so as to be concentric to wall 126. Tube portion 122*b* includes relief notches or channels that define exit flow passages 128 between tube portion 122*b* and wall 126. The exit flow passages are additionally illustrated in FIGS. 8 and 11 and are actually defined by the cooperating combination of the wall 126 and the axial, inwardly-projecting ribs 131 that are formed as part of unitary filter carrier 122. The filter carrier 122 is a component part that could also be described as a top end plate, based upon its shape. FIG. 10 illustrates the upper portion of the rotor shell or housing and is suitable for use with both disposable rotor embodiments.

In order to seal off the upper portion of the centrifuge so as to prevent the bypass of blowby gas, annular lip seal 113 is provided. Annular lip seal 113 is captured by an annular recess 129 in the centrifuge housing. The spaced pair of sealing lips contact tube portion 122*b* so as to seal off any exit path at that interface. The effect of this structure and the cooperating combination of component parts is to enable blowby gas to enter filter element 121 (outwardly in) and flow through the exit flow passages 128 and, from there, out through blowby outlet 130. Potential bypass paths are all sealed closed such that the utilization of the coalescing filter assembly 112 is maximized.

The FIG. 5 illustration completes the structural disclosure for centrifuge 105. While a few additional structural details are added by FIG. 5, the majority of the illustrated structure is virtually identical to what is illustrated in FIG. 4. One feature that shows in FIG. 5 and is not visible in FIG. 4 is one of the flow (jet) nozzles 133. The annular uniformity or symmetry for coalescing filter assembly 112 means that it appears substantially the same in FIG. 5 as it does in FIG. 4.

The evolution of the centrifuge design illustrated in FIGS. 4 and 5 involves certain design decisions based on prototype testing. One design change reflected in FIGS. 4 and 5 is that shaft 109 is not "shouldered" in the vicinity of lower bushing 111. This design change rotary motion contributes an improved design.

Figure 6:
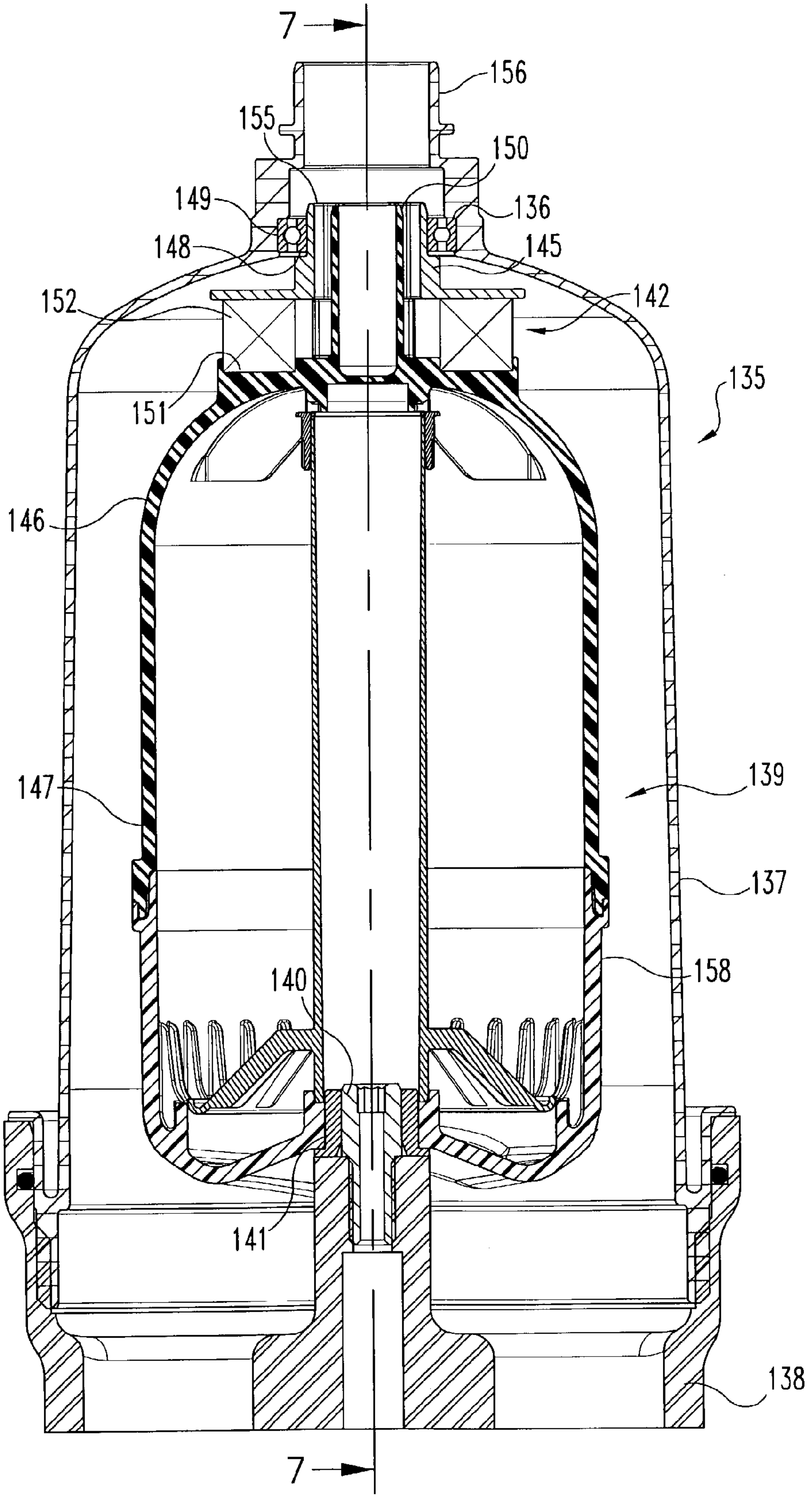
FIG. 6 is a front elevational view, in full section, of a centrifuge with a disposable rotor according to another embodiment of the present invention.
Figure 7:
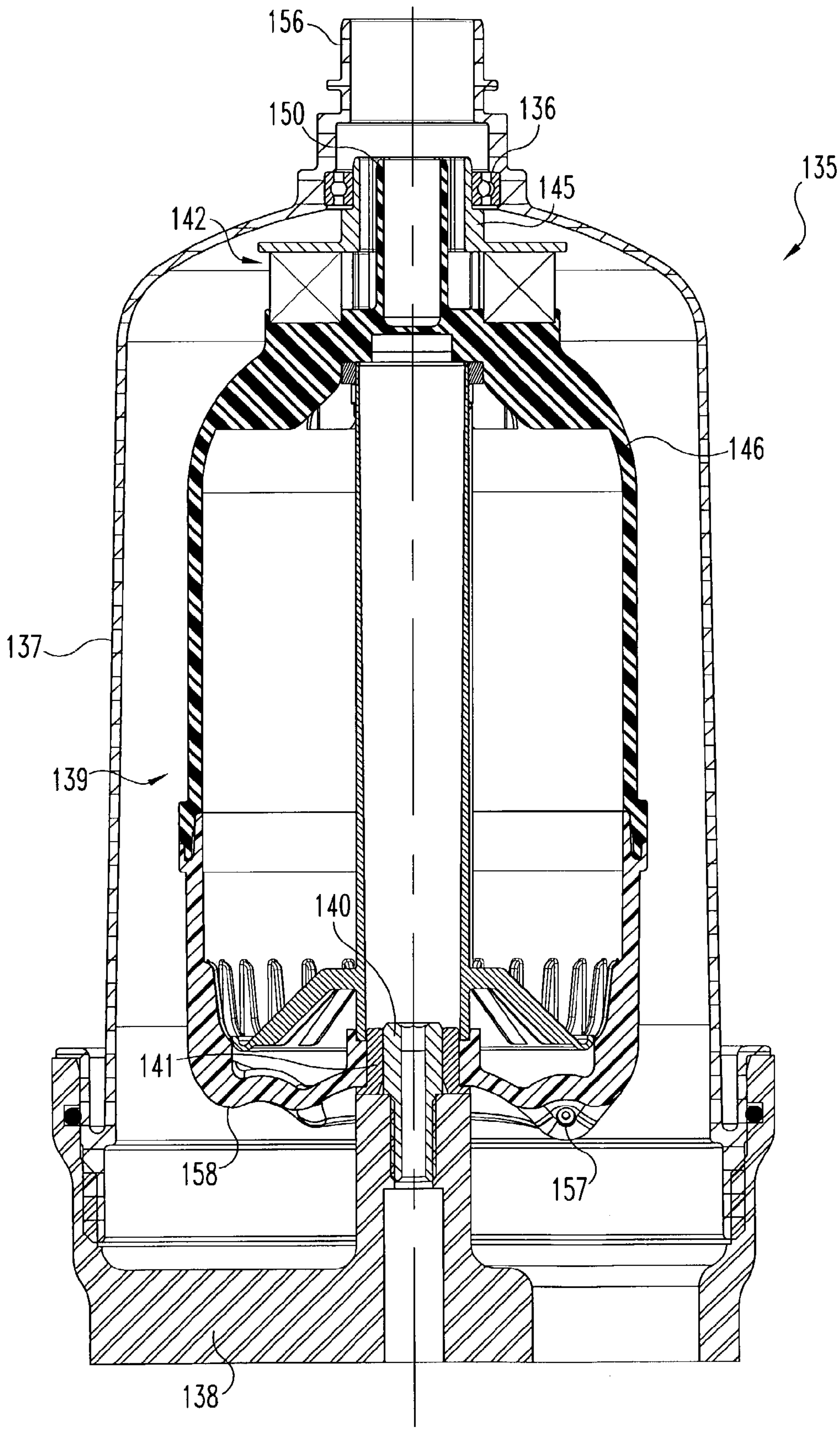
FIG. 7 is a front elevational view, in full section, of the FIG. 6 centrifuge.
Figure 9:
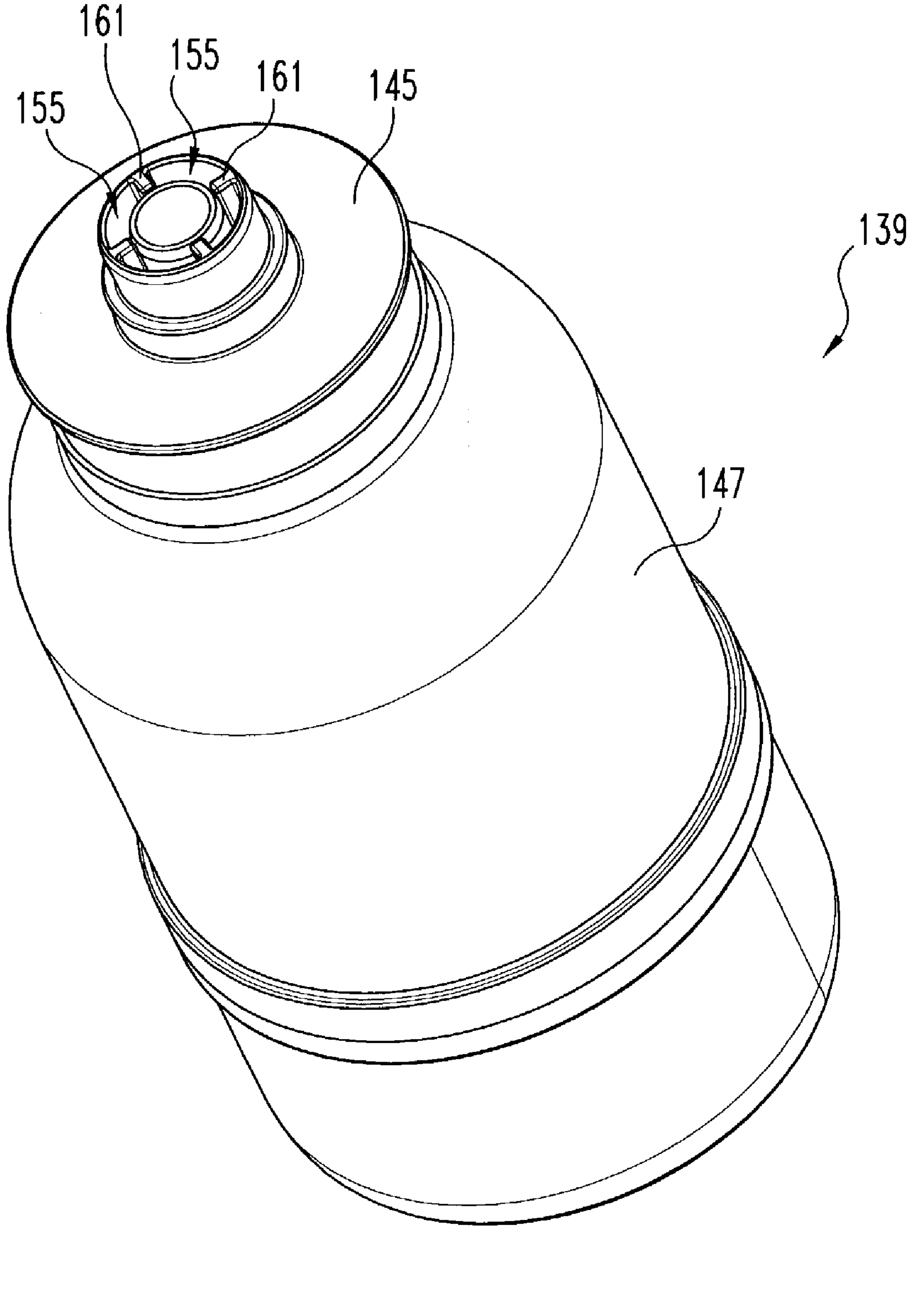
FIG. 9 is a perspective view of an alternative rotor assembly according to another embodiment of the present invention.
Figure 12:
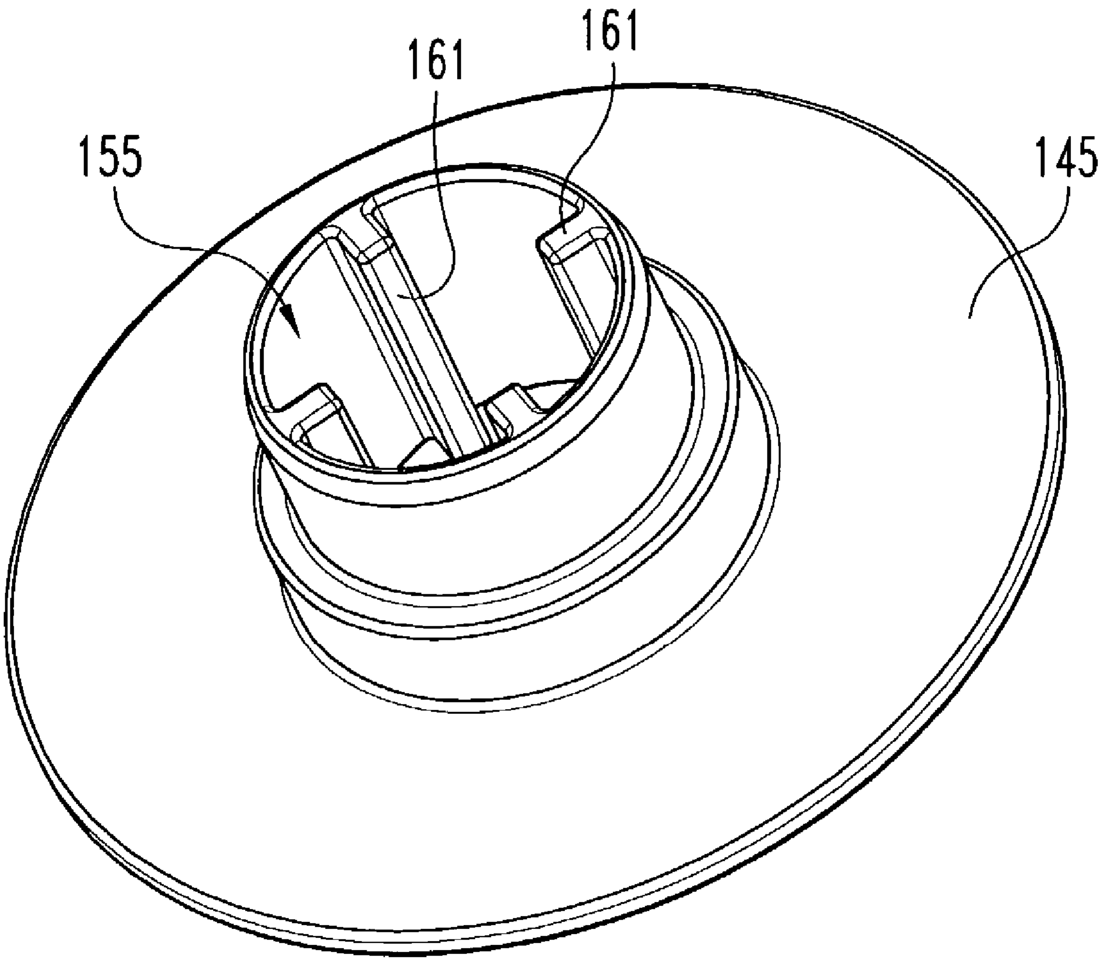
FIG. 12 is a perspective view of a top end plate that comprises one part of the FIG. 9 rotor assembly.

Referring now to FIGS. 6 and 7, a centrifuge structure similar to centrifuge 105 of FIGS. 4 and 5 is illustrated. The primary difference between centrifuge 105 and centrifuge 135 is the elimination of elastomeric lip seal 113 and the use of a sealed roller bearing 136 in its place. The exchange of the lip seal 113 for the roller bearing 136 requires other structural changes or modifications in centrifuge 135. These other structural changes include the shaft, the upper section of the rotor housing, the tube portion of the filter carrier, and the centrifuge housing. The remainder of centrifuge 135 is basically the same as centrifuge 105, including the disposable rotor. While the assembly details are illustrated in FIGS. 6 and 7, FIG. 9 illustrates the rotor assembly 139 for this second disposable rotor design. FIG. 10 illustrates the upper section or portion of rotor assembly 139, noting that upper section 117 and upper section 146 are virtually identical in their construction. FIG. 12 illustrates top end plate 145 and this component may alternatively be referred to as a filter carrier due to its function as part of the FIGS. 6 and 7 centrifuge structure.

Referring to FIG. 6, centrifuge 135 additionally includes an outer housing 137, base 138, disposable rotor 139, shaft 140, lower bushing 141, and coalescing filter assembly 142. Accepting that centrifuge 135 is virtually identical to centrifuge 105 in structure and performance, except for the replacement of lip seal 113 by roller bearing 136, the following description of centrifuge 135 focuses on the design changes required to accommodate roller bearing 136. Likely the most obvious design change is to the shaft. When upper bushing 110 is used, the shaft 109 extends through the entire length (axial height) of the disposable rotor 108 and includes a reduced diameter upper end that is received by the upper bushing. When roller bearing 136 is used, the shaft 140 is reduced to the short post design illustrated in FIG. 6.

By positioning roller bearing 136 between the filter carrier 145 and the centrifuge housing 137, the disposable rotor 139, including the coalescing filter assembly 142, is suspended for high speed rotation within the centrifuge housing 137. This in turn allows the upper section 146 of the rotor housing 147 to be closed, since no opening is required for the shaft. The closing off of upper section 146 represents another noticeable design change for centrifuge 135. The configuration of filter carrier 145 is changed slightly for incorporation into centrifuge 135 in order to create an outside diameter shelf of ledge 148 for receipt of roller bearing 136. A somewhat similar and cooperating design change is made to the centrifuge housing 137 in order to receive the outside diameter of roller bearing 136. The annular recess 149 in housing 137 is sized and aligned radially from ledge 148 for the proper positioning and retention of roller bearing 136. The selected sizing and positioning of these components allows the outside diameter size of the upper cylindrical wall 150 of the upper section to be slightly smaller than the outside diameter size of wall 126.

Consistent with the design of centrifuge 105, the coalescing filter assembly 142 of centrifuge 135 is assembled to the disposable rotor 139 by being positioned onto shelf 151 and is sealed so that blowby gas is forced to flow into filter element 152 and, from there, to pass through exit flow passages 155 before exiting by way of blowby outlet 156. All possible bypass paths are structurally closed and/or sealed so as to ensure that all blowby gas is routed into the coalescing filter element 152. The exit flow passages 155 are additionally illustrated in FIGS. 9 and 12 and are actually defined by the cooperating combination of the upper wall portion of filter carrier 145 and the axial, inwardly-projecting ribs 161 that are formed as part of unitary filter carrier 145.

Referring to FIG. 7, this drawing illustrates the cross sectional appearance of centrifuge 135 along a cutting plane that is ninety degrees from that illustrated in FIG. 6. The annular shape of most components used for centrifuge 135 and the circumferential symmetry of these components causes the FIG. 7 illustration to be virtually identical to the FIG. 6 illustration. While there are minor differences, the most notable is the appearance of one of the two flow (jet) nozzles 157 formed as part of the lower section 158 of the rotor housing 147.

The evolution of the centrifuge design illustrated in FIGS. 6 and 7 involved certain design decisions based on prototype testing. One design change reflected in FIGS. 6 and 7 is that shaft 140 is not "shouldered" in the vicinity of lower bushing 141. This design change contributes to an improved design.

Although the centrifuge structures of FIGS. 2–7 each include a pair of flow (jet) nozzles in order to impart (self-driven) rotary motion to the corresponding rotor, other drive mechanisms can be used, still consistent with the integration of a coalescing filter assembly for processing blowby gas. For example, U.S. Pat. No. 6,017,300, which issued Jan. 25, 2000 to Herman, discloses an impulse turbine arrangement adjacent the base of the rotor for imparting rotary motion to the rotor. The fluid for the flow jet(s) that drive the turbine may be the fluid that is processed by the centrifuge or may be from a secondary source and may be a liquid or a gas. Since the lower portion of the rotor is effectively unchanged by any of the design changes between centrifuge 41 (FIG. 2), centrifuge 80 (FIG. 3), centrifuge 105 (FIGS. 4 and 5), and centrifuge 135 (FIGS. 6 and 7), it will be understood that any of the four centrifuge designs described above are equally and fully compatible with virtually any type of drive mechanism for rotation of the rotor. Any reference to "drive means" includes both the Hero turbine structures that are illustrated and the impulse turbine structure of the '300 patent and equivalents thereto. Further, U.S. Pat. No. 6,017,300 is expressly incorporated by reference herein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:

a centrifuge for separating particulate matter from a circulating liquid, said centrifuge including a base defining a blowby gas inlet, an outer housing assembled to the base and defining a blowby gas outlet, said base and said outer housing cooperating to define a hollow interior, a rotor positioned in said hollow interior and being constructed and arranged to receive said circulating liquid and drive means for rotating said rotor;

said rotor including a rotor housing and a centertube, said centertube including an end portion that is exterior to said rotor housing; and a coalescing filter assembly attached to said centertube end portion, said coalescing filter assembly being constructed and arranged for removing oil aerosol from a blowby gas entering said centrifuge via said blowby gas inlet and flowing toward said blowby gas outlet external to said rotor, said coalescing filter assembly being assembled to said rotor at a location between said rotor and said blowby gas outlet wherein said coalescing filter assembly rotates with said rotor, wherein said coalescing filter assembly includes a filter carrier having a threaded wall, and wherein said centertube end portion is threaded and constructed and arranged for threaded engagement with said threaded wall.

2. The combination of claim 1 wherein said coalescing filter assembly includes a filter element and a support plate, said filter element being positioned between said support plate and said filter carrier.

3. The combination of claim 2 wherein said support plate is flexible.

4. The combination of claim 3 wherein said filter carrier defines a passage for an exit path for blowby gas exiting said filter element.

5. The combination of claim 4 wherein said filter carder includes an upper cylindrical wall.

6. The combination of claim 5 wherein said centrifuge includes a bearing received by said outer housing.

7. The combination of claim 6 wherein said bearing is positioned between said outer housing and said upper cylindrical wall.

8. The combination of claim 7 wherein said drive means includes a Hero turbine arrangement.

9. The combination of claim 7 wherein said drive means includes an impulse turbine arrangement.

10. In combination:

a centrifuge for separating particulate matter from a circulating liquid, said centrifuge including a base defining a blowby gas inlet, an outer housing assembled to the base and defining a blowby gas outlet, said base and said outer housing cooperating to define a hollow interior, a rotor positioned in said hollow interior and being constructed and arranged to receive said circulating liquid and drive means for rotating said rotor;

said rotor including a rotor housing and a centertube, said centertube including an end portion that is exterior to said rotor housing; and a coalescing filter assembly attached to said centertube end portion, said coalescing filter assembly being constructed and arranged for removing oil aerosol from a blowby gas entering said centrifuge via said blowby gas inlet and flowing toward said blowby gas outlet external to said rotor, said coalescing filter assembly being assembled to said rotor at a location between said rotor and said blowby gas outlet wherein said coalescing filter assembly rotates with said rotor, wherein said drive means comprises a Hero turbine arrangement, and said coalescing filter assembly includes a filter carrier having a threaded wall, and wherein said centertube end portion is threaded and constructed and arranged for threaded engagement with said threaded wall.

11. In combination:

a centrifuge for separating particulate matter from a circulating liquid, said centrifuge including a base defining a blowby gas inlet, an outer housing assembled to the base and defining a blowby gas outlet, said base and said outer housing cooperating to define a hollow interior, a rotor positioned in said hollow interior and being constructed and arranged to receive said circulating liquid and drive means for rotating said rotor;

said rotor including a rotor housing and a centertube, said centertube including an end portion that is exterior to said rotor housing; and a coalescing filter assembly attached to said centertube end portion, said coalescing filter assembly being constructed and arranged for removing oil aerosol from a blowby gas entering said centrifuge via said blowby gas inlet and flowing toward said blowby gas outlet external to said rotor, said coalescing filter assembly being assembled to said rotor at a location between said rotor and said blowby gas outlet wherein said coalescing filter assembly rotates with said rotor, wherein said drive means comprises an impulse turbine arrangement, and said coalescing filter assembly includes a filter carrier having a threaded wall, and wherein said centertube end portion is threaded and constructed and arranged for threaded engagement with said threaded wall.

12. In combination:

a centrifuge for separating particulate matter from a circulating liquid, said centrifuge including a base defining a blowby gas inlet, an outer housing assembled to the base and defining a blowby gas outlet, said base and said outer housing cooperating to define a hollow interior, a rotor positioned in said hollow interior and being constructed and arranged to receive said circulating liquid and drive means for rotating said rotor;

said rotor including a rotor housing and a centertube, said centertube including an end portion that is exterior to said rotor housing; and a coalescing filter assembly attached to said centertube end portion, said coalescing filter assembly being constructed and arranged for removing oil aerosol from a blowby gas entering said centrifuge via said blowby gas inlet and flowing toward said blowby gas outlet eternal to said rotor, said coalescing filter assembly being assembled to said rotor at a location between said rotor and said blowby gas outlet wherein said coalescing filter assembly rotates with said rotor, wherein said rotor has an axis of rotation and said coalescing filter assembly includes a filter element having a radial centerline that is substantially perpendicular to said axis of rotation, and said coalescing filter assembly includes a filter carrier having a threaded wall, and wherein said centertube end portion is threaded and constructed and arranged for threaded engagement with said threaded wall.

13. The combination of claim 12 wherein said coalescing filter assembly includes a filter element and a support plate, said filter element being positioned between said support plate and said filter carrier.

14. The combination of claim 13 wherein said support plate is flexible.

15. The combination of claim 14 wherein said filter carrier defines a passage for an exit path for blowby gas exiting said filter element.

16. In combination:

a centrifuge for separating particulate matter from a circulating liquid, said centrifuge including a base defining a blowby gas inlet, an outer housing assembled to the base and defining a blowby gas outlet, said base and said outer housing cooperating to define a hollow interior, a rotor positioned in said hollow interior and being constructed and arranged to receive said circulating liquid and drive means for rotating said rotor;

said rotor including a rotor housing and a centertube, said centertube including an end portion that is exterior to said rotor housing; and a coalescing filter assembly attached to said centertube end portion, said coalescing filter assembly being constructed and arranged for removing oil aerosol from a blowby gas entering said centrifuge via said blowby gas inlet and flowing toward said blowby gas outlet eternal to said rotor, said coalescing filter assembly being assembled to said rotor at a location between said rotor and said blowby gas outlet wherein said coalescing filter assembly rotates with said rotor, wherein said rotor has an axis of rotation and said coalescing filter assembly includes a filter element having a flow through centerline that is inclined relative to said axis of rotation, and said coalescing filter assembly includes a filter carrier having a threaded wall, and wherein said centertube end portion is threaded and constructed and arranged for threaded engagement with said threaded wall.

17. The combination of claim 16 wherein said coalescing filter assembly includes a filter element and a support plate, said filter element being positioned between said support plate and said filter carrier.

18. The combination of claim 17 wherein said support plate is flexible.

19. The combination of claim 18 wherein said drive means includes a Hero turbine arrangement.

20. The combination of claim 18 wherein said drive means includes an impulse turbine arrangement.

21. In combination:

a centrifuge for separating particulate matter from a circulating liquid, said centrifuge including a base defining a blowby gas inlet, an outer housing assembled to the base and defining a blowby gas outlet, said base and said outer housing cooperating to define a hollow interior, a rotor positioned in said hollow interior and being constructed and arranged to receive said circulating liquid and drive means for rotating said rotor;

said rotor including a rotor housing that is constructed and arranged to define an exterior annular recess; and a coalescing filter assembly adhesively bonded into said exterior annular recess, said coalescing filter assembly being constructed and arranged for removing oil aerosol from a blowby gas entering said centrifuge via said blowby gas inlet and flowing toward said blowby gas outlet external to said rotor, said coalescing filter assembly being assembled to said rotor at a location between said rotor and said blowby gas outlet wherein said coalescing filter assembly rotates with said rotor.

22. In combination:

a centrifuge for separating particulate matter from a circulating liquid, said centrifuge including a base defining a blowby gas inlet, an outer housing assembled to the base and defining a blowby gas outlet, said base and said outer housing cooperating to define a hollow interior, a rotor positioned in said hollow interior and being constructed and arranged to receive said circulating liquid and flow nozzle or impulse turbine drive means for rotating said rotor, said base having a center tube having flow openings to deliver the circulating liquid onto the rotor receiving said circulating liquid, said base having an inlet receiving said blowby gas; and a coalescing filter assembly constructed and arranged for removing oil aerosol from a blowby gas entering said centrifuge via said blowby gas inlet and flowing toward said blowby gas outlet external to said rotor, said coalescing filter assembly being assembled to said rotor at a location between said rotor and said blowby gas outlet wherein said coalescing filter assembly rotates with said rotor, wherein said coalescing filter assembly includes an attachment wall, and said rotor has an attachment surface engaging and attached to said attachment wall.

23. The combination of claim 22 wherein said coalescing filter assembly includes a filter element, and wherein said coalescing filter assembly defines a passage for an exit path for blowby gas exiting said filter element to flow to said blowby gas outlet of said outer housing.

24. The combination of claim 22 wherein said centrifuge has a first flow path therethrough from said center tube through the interior of said rotor via said center tube to said drive means, and said centrifuge has a second path therethrough from said second inlet then through said hollow interior of said cooperating base and outer housing external to said rotor then through said coalescing filter assembly then to said blowby gas outlet, said second path external to said rotor being separate from said first path internal of said rotor.

* * * * *